United States Patent [19]

Chiao

[11] Patent Number: 5,623,044
[45] Date of Patent: Apr. 22, 1997

[54] POLYURETHANE SEALANT COMPOSITIONS

[75] Inventor: Wen B. Chiao, Bridgewater, N.J.

[73] Assignee: Essex Specialty Products, Inc., Clifton, N.J.

[21] Appl. No.: 690,301

[22] Filed: Aug. 9, 1996

Related U.S. Application Data

[63] Continuation of Ser. No. 445,573, May 22, 1995, abandoned, which is a continuation of Ser. No. 960,098, Oct. 13, 1992, abandoned.

[51] Int. Cl.$^6$ ............................ C08G 77/04; C08G 18/00
[52] U.S. Cl. .................................. 528/28; 528/44
[58] Field of Search ............................ 528/28, 44

[56] References Cited

U.S. PATENT DOCUMENTS

| | | | |
|---|---|---|---|
| 3,372,083 | 3/1968 | Evans et al. | 528/48 |
| 3,502,704 | 3/1970 | McKellar | 260/448.8 |
| 3,627,722 | 12/1971 | Selter | 524/590 |
| 3,886,226 | 5/1975 | Asai et al. | 260/77.5 |
| 4,284,751 | 8/1981 | Hutt et al. | 528/45 |
| 4,345,053 | 8/1982 | Rizk et al. | 525/440 |
| 4,374,237 | 2/1983 | Berger et al. | 528/28 |
| 4,539,345 | 9/1985 | Hansen | 523/219 |
| 4,555,561 | 11/1985 | Sugimori et al. | 528/26 |
| 4,625,012 | 11/1986 | Rizk et al. | 528/28 |
| 4,650,835 | 3/1987 | Eck et al. | 525/440 |
| 4,687,533 | 8/1987 | Rizk et al. | 156/307 |
| 4,720,536 | 1/1988 | House et al. | 528/60 |
| 4,758,648 | 7/1988 | Rizk et al. | 528/53 |
| 4,963,614 | 10/1990 | Ito et al. | 524/495 |
| 4,963,636 | 10/1990 | Mülhaupt et al. | 528/28 |
| 5,342,867 | 8/1994 | Ryan et al. | 524/101 |

FOREIGN PATENT DOCUMENTS

| | | |
|---|---|---|
| 0082528 | 6/1983 | European Pat. Off. . |
| 0533275 | 3/1993 | European Pat. Off. . |

*Primary Examiner*—Patrick Niland

[57] ABSTRACT

Described herein is a polyurethane sealant composition comprising (1) a urethane prepolymer having an isocyanate functionality of at least about 2.0 and a molecular weight of at least about 2,000; and (2) the reaction product of a secondary amino- or mercaptoalkoxy silane and a polyisocyanate having an average of at least one silane group and at least one isocyanate group per molecule and a molecular weight of less than about 2,000. The sealant composition of the invention is particularly useful in bonding glass to metal substrates when the glass substrate has not been primed with an application of a separate primer composition prior to the application of the sealant.

26 Claims, No Drawings

POLYURETHANE SEALANT COMPOSITIONS

CROSS-REFERENCE TO RELATED APPLICATION

This is a continuation of application Ser. No. 08/445,573 filed May 22, 1995, now abandoned, which is a continuation of application Ser. No. 07/960,098, filed Oct. 13, 1992, now abandoned.

BACKGROUND OF THE INVENTION

This invention relates to polyurethane sealant compositions and, more specifically, to polyurethane sealant compositions which contain silane groups.

Polyurethane sealant compositions typically comprise at least one urethane prepolymer. Sealants useful for bonding to non-porous substrates, such as glass are described, for example, in U.S. Pat. No. 4,374,237 and U.S. Pat. No. 4,687,533. U.S. Pat. No. 4,374,237 describes a polyurethane sealant containing urethane prepolymers which have been further reacted with secondary amine compounds containing two silane groups. U.S. Pat. No. 4,687,533 describes a polyurethane sealant containing urethane prepolymers which contain silane groups which have been prepared by reacting a polyisocyanate having at least three isocyanate groups with less than an equivalent amount of an alkoxysilane having a terminal group containing active hydrogen atoms reactive with isocyanate groups to form an isocyanatosilane having at least two unreacted isocyanate groups. In a second step, the isocyanatosilane is mixed with additional polyisocyanate and the mixture is reacted with a polyol to form a polyurethane prepolymer having terminal isocyanato groups and pendant alkoxysilane groups.

However, when such sealants are used to bond glass substrates to metal substrates, such as for window installation in vehicle manufacturing, the lap shear strength of the bonded substrate may be less than desirable for safety or structural purposes. Consequently a separate glass primer comprising a solution of one or more silanes is typically applied to the glass prior to the application of the sealant in most vehicle assembly operations for bonding the windshield and the rear window. It would be desirable to provide a polyurethane sealant which, when bonded to a non-porous substrate and cured, provides a bonded substrate with a higher lap shear strength, particularly when used in the absence of a glass primer.

SUMMARY OF THE INVENTION

In one aspect, this invention is a polyurethane sealant composition comprising (1) a urethane prepolymer having an isocyanate functionality of at least about 2.0 and a molecular weight of at least about 2,000; and (2) a reaction product of a secondary amino- or mercaptoalkoxy silane and a polyisocyanate which has an average of at least one silane group and at least one isocyanate group per molecule and a molecular weight of less than about 2,000.

The sealant composition of the invention is useful in bonding glass substrates to metal substrates, and has been discovered to give unexpectedly high lap shear strength when no primer compositions have previously been applied to the glass substrate.

DETAILED DESCRIPTION OF THE INVENTION

Suitable urethane prepolymers for use in preparing the composition of the invention include any compound having an average isocyanate functionality of at least about 2.0 and a molecular weight of at least about 2,000. Preferably the average isocyanate functionality of the prepolymer is at least about 2.2 and is more preferably at least about 2.4. Preferably, the molecular weight of the prepolymer is at least about 2,500, and is more preferably at least about 3,000; and is preferably no greater than about 20,000, more preferably no greater than about 15,000, and is most preferably no greater than about 10,000. The prepolymer may be prepared by any suitable method, such as by reacting an isocyanate-reactive compound containing at least two isocyanate-reactive groups with an excess over stoichiometry of a polyisocyanate under reaction conditions sufficient to form the corresponding prepolymer.

Suitable polyisocyanates for use in preparing the prepolymer include any aliphatic, cycloaliphatic, araliphatic, heterocyclic or aromatic polyisocyanate, or mixture thereof, with an average isocyanate functionality of at least about 2.0 and an equivalent weight of at least about 80. Preferably, the isocyanate functionality of the polyisocyanate is at least about 2.0, more preferably at least about 2.2, and is more preferably at least about 2.3; and is preferably no greater than about 4.0, more preferably no greater than about 3.5, and is most preferably no greater than about 3.0. Higher functionalities may also be used, but may cause excessive crosslinking, and result in an adhesive which is too viscous to handle and apply easily, and can cause the cured adhesive to be too brittle. Preferably, the equivalent weight of the polyisocyanate is at least about 100, more preferably at least about 110, and is more preferably at least about 120; and is preferably no greater than about 300, more preferably no greater than about 250, and is most preferably no greater than about 200.

Examples of such polyisocyanates include ethylene diisocyanate, 1,4-tetramethylene diisocyanate, 1,6-hexamethylene diisocyanate, 1,12-dodecane diisocyanate, cyclobutane-1,3-diisocyanate, cyclohexane-1,3- and 1,4-diisocyanate and mixtures of these isomers; 1-isocyanato-3,3,5-trimethyl-5-isocyanato methyl cyclohexane (see e.g., German Auslegeschrift No. 1,202,785); 2,4- and 2,6-hexahydrotolylene diisocyanate and mixtures of these isomers, hexahydro-1,3- and/or 1,4-phenylene diisocyanate, perhydro-2,5'- and/or 4,4'-diphenyl methane diisocyanate, 1,3- and 1,4-phenylene diisocyanate, 2,4- and 2,6-tolylene diisocyanate and mixtures of these isomers, diphenyl methane-2,4'- and/or 4,4'-diisocyanate, naphthylene-1,5-diisocyanate, triphenyl methane-4,4',4"-triisocyanate, polyphenyl polymethylene polyisocyanates of the type obtained by condensing aniline with formaldehyde, followed by phosgenation and such as described for example in British Patents 874,430 and 848,671, perchlorinated aryl polyisocyanates of the type described in German Auslegeschrift 1,157,601, polyisocyanates containing carbodiimide groups of the type described in German Patent 1,092,007, diisocyanates of the type described in U.S. Pat. No. 3,492,330, polyisocyanates containing allophanate groups of the type described, for example, in British Patent 994,890, in Belgian Patent 761,626 and in published Dutch Patent Application No. 7,102,524, polyisocyanates containing isocyanurate groups of the type described in German Patents 1,022,789; 1,222,067 and 1,027,394 and in German Offenlegungsschrift 1,929,034 and 2,004,048, polyisocyanates containing urethane groups of the type described, for example, in Belgian Patent 752,261 or in U.S. Pat. No. 3,394,164, polyisocyanates containing acrylated urea groups as described in German Patent 1,230,778, polyisocyanates containing biuret groups of the type described, for example, in German Patent 1,101,392, in British Patent 889,050 and in French Patent 7,017,514, polyisocyanates obtained by telomerization reactions of the type described, for example, in Belgian Patent 723,640, polyisocyanates containing ester groups of the type described, for example, in British Patents 965,474 and 1,072,956, in U.S. Pat. No. 3,567,763 and in German Patent 1,231,688 and reaction products of the aforementioned isocyanates with acetals as described in German Patent 1,072,385. Preferably the polyisocyanate is an aromatic or cycloaliphatic polyisocyanate such as diphenyl- methane-4,4'-diisocyanater isophorone diisocyanate, tetramethylxylene diisocyanater and is most preferably diphenylmethane-4,4'-diisocyanate.

The term "isocyanate-reactive compound" as used herein includes any organic compound having at least two isocyanate-reactive moietiesr such as a compound containing an active hydrogen moiety, or an imino- -functional compound. For the purposes of this invention, an active hydrogen moiety refers to a moiety containing a hydrogen atom which, because of its position in the molecule, displays significant activity according to the Zerewitnoff test described by Wohler in the Journal of the American Chemical Society, Vol. 49, p. 3181 (1927). Illustrative of such active hydrogen moieties are —COOH, —OH, —$NH_2$, —NH—, —$CONH_2$, —SH, and —CONH—. Typical active hydrogen containing compounds include polyols, polyamines, polymercaptans and polyacids. Suitable imino-functional compounds are those which have at least one terminal imino group per molecule, such as are described, for example, in U.S. Pat. No. 4,910,279, which is hereby incorporated by reference in its entirety. Preferably, the isocyanate- -reactive compound is a polyol, and is more preferably a polyether polyol.

Suitable polyols useful in the preparation of the prepolymers include, for example, polyether polyols, polyester polyols, poly(alkylene carbonate)polyols, hydroxyl-containing polythioethers, polymer polyols, and mixtures thereof. Polyether polyols are well-known in the art and includes for examples polyoxyethylene, polyoxypropylene, polyoxybutylene, and polytetramethylene ether diols and triols which are prepared by reacting an unsubstituted or halogen- or aromatic-substituted ethylene oxide or propylene oxide with an initiator compound containing two or more active hydrogen groups such as water, ammonia, a polyalcohol, or an amine. Such methods are described, for example, in U.S. Pat. Nos. 4,269,945; 4,218,543; and 4,374,210; which are hereby incorporated by reference in their entirety. In general, polyether polyols may be prepared by polymerizing alkylene oxides in the presence of an active hydrogen-containing initiator compound. Most preferred, however, are ethylene oxide-capped polyols prepared by reacting glycerine with propylene oxide, followed by reacting with ethylene oxide.

Suitable alkylene oxides include ethylene oxide, propylene oxide, butylene oxides, styrene oxide, epichlorohydrin, epibromohydrin, and mixtures thereof. Suitable initiator compounds include water, ethylene glycol, propylene glycol, butanediol, hexanediol, glycerin, trimethylol propane, pentaerythritol, hexanetriol, sorbitol, sucrose, hydroquinone, resorcinol, catechol, bisphenols, novolac resins, phosphoric acid, amines, and mixtures thereof.

Polyester polyols are also well-known in the art and may be prepared by reacting a polycarboxylic acid or anhydride thereof with a polyhydric alcohol. Examples of suitable polycarboxylic acids include succinic acid, adipic acid, suberic acid, azelaic acid, sebacic acid, phthalic acid, isophthalic acid, maleic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, maleic acid anhydride, glutaric acid anhydride, fumaric acid, an mixtures thereof. Examples of suitable polyhydric alcohols include ethylene glycols, propane diols, butane diols, 1,6-hexanediol, 1,8-octanediol, neopentylglycol, glycerol, trimethylol propane, pentaerythritol, quinitol, mannitol, sorbitol, methyl glycoside, diethylene glycol, triethylene glycol, tetraethylene glycol, polyethylene glycols, polypropylene glycols, and mixtures thereof.

Suitable polymer polyols include dispersions of polymers of vinyl monomers in a continuous polyol phase, particularly dispersions of styrene/acrylonitrile copolymers. Also useful are the so-called polyisocyanate polyaddition (PIPA) polyols (dispersions of polyurea-polyurethane particles in a polyol) and the polyurea dispersions in polyols (PHD polyols). Copolymer polyols of the vinyl type are described, for example, in U.S. Pat. Nos. 4,390,645, 4,463,107, 4,148,840 and 4,574,137, all incorporated by reference.

Preferably, the isocyanate-reactive compound has a functionality of at least about 1.5, more preferably at least about 1.8, and is most preferably at least about 2.0; and is preferably no greater than about 3.0, more preferably no greater than about 3.5, and is most preferably no greater than about 4.0. Preferably, the equivalent weight of the isocyanate-reactive compound is at least about 200, more preferably at least about 500, and is more preferably at least about 1,000; and is preferably no greater than about 3,500, more preferably no greater than about 3,000, and is most preferably no greater than about 2,500.

The prepolymer may be prepared by any suitable method, such as bulk polymerization and solution polymerization. The reaction to prepare the prepolymer is carried out under anhydrous conditions, preferably under an inert atmosphere such as a nitrogen blanket, to prevent crosslinking of the isocyanate groups by atmospheric moisture. The reaction is preferably carried out at a temperature between 0° C. and 150° C., preferably between 25° C. and 80° C., until the residual isocyanate content determined by titration of a sample is very close to the desired theoretical value. The isocyanate content in the prepolymers is preferably in the range of 1.0 percent to 10 percent, more preferably in the range of 1.5 percent to 5.0 percent and most preferably in the range of 1.8 percent to 3.0 percent.

Component (2) of the sealant composition of the invention is a reaction product of a secondary amino- or mercaptoalkoxy silane and a polyisocyanate, having an average of at least one silane group and at least one isocyanate group per molecule (hereinafter "adduct"). Preferably, the adduct has at least 1.5 isocyanate groups and at least one silane group per molecule, and most preferably has at least two isocyanate groups and at least one silane group per molecule. The adduct level in the sealant compositions is preferably in the range of 0.5 percent to 20 percent, more preferably in the range of 1.0 percent to 10 percent and most preferably in the range of 2.0 percent to 7 percent. The adduct may be prepared by any suitable method, such as, for example, by reacting an secondary amino- or mercapto-alkoxy silane with a polyisocyanate compound. Suitable polyisocyanates for use in preparing the adduct include those described above as suitable for use in preparing the prepolymer, particularly including isopherone diisocyanate, polymethylene polyphenylisocyanates, and aliphatic polyisocyanate such as hexamethylene diisocyanate. Preferably, the polyisocyanate is an aliphatic polyisocyanate and is most preferably an aliphatic polyisocyanate based on hexamethylene diisocyanate with an equivalent weight of about 195. The polyisocyanate used to prepare the isocyanato silane adduct preferably has a molecular weight of less than about 2,000, more preferably less than about 1,000. Suitable organofunctional silanes include amino- or mercapto-alkoxysilanes of the formula:

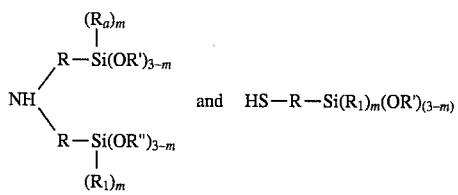

wherein R is a divalent organic group, preferably $C_{1-4}$ alkylene, R', R", $R_1$ and $R_a$ are hydrogen or alkyl, preferably $C_{1-4}$ alkyl, m is an integer from 0 to 2. Examples of such compounds include: N,N-bis[(3 -triethoxysilyl)propyl] amine; N,N-bis[(3-tripropoxysilyl)propyl]amine; N-(3-trimethoxysilyl)propyl-3-[N-(3 -trimethoxysilyl)-propylamino]propionamide; N-(3 -triethoxysilyl)propyl-3-[N-3-triethoxysilyl)-propylamino]propionamide; N-(3- trimethoxysilyl)propyl-3-[N-3-triethoxysilyl)-propylamino] propionamide; 3-trimethoxysilylpropyl 3-[N-(3-trimethoxysilyl)-propylamino]-2-methyl propionate; 3-triethoxysilylpropyl 3-[N-(3-triethoxysilyl)-propylamino] -2-methyl propionate; 3-trimethoxysilylpropyl 3-[N-(3-triethoxysilyl) -propylamino]-2-methyl propionate; and the like. Preferably the organofunctional silane is gamma-mercaptopropyl-trimethoxysilane (available as A189 from Union Carbide) or N,N'-bis((3-trimethoxysilyl)propyl) amine.

The silane and the polyisocyanate reactants preferably combined so that the ratio of isocyanate groups to secondary amine or mercapto groups in the reaction mixture to prepare component (2) is at least about 1.5, more preferably at least about 2.0, and most preferably at least about 2.5; and is preferably no greater than about 6.0, more preferably no greater than about 5.5, and most preferably no greater than about 5.0.

The component (2) may be prepared by any suitable method, such as bulk or solution polymerization. The reaction between the polyisocyanate and the organofunctional silane is preferably carried out under anhydrous conditions, preferably under an inert atmosphere such as a nitrogen blanket, to prevent premature hydrolysis of the alkoxysilane groups and/or crosslinking of the isocyanate groups by atmospheric moisture. The polyisocyanate and alkoxysilane are preferably reacted under anhydrous conditions at a temperature between room temperature (about 20° C.) and about 80° C. Depending on the reagents, an exotherm may develop so that no external heating is required. Indeed, cooling may be necessary. The reaction is generally complete within two hours and may be catalyzed with a tin catalyst, suitably a tin salt such as a tin carboxylate, if desired.

The reaction is suitably carried out in heat or in an inert liquid diluent or carrier. While any of the conventional inert organic solvents such as the benzene, toluene, xylene and other hydrocarbons or halohydrocarbons can be employed, it is preferable to use a compound having plasticizing properties, since the use of a plasticizer avoids the need for isolating the active reaction products from the reaction mixtures.

The reactions to prepare the prepolymer and the adduct may be carried out in the presence of urethane catalysts. Examples of such include the stannous salts of carboxylic acids, such as stannous octoate, stannous oleate, stannous acetate, and stannous laurate. Also, dialkyltin dicarboxylates such as dibutyltin dilaurate and dibutyltin diacetate are known in the art as urethane catalysts, as are tertiary amines and tin mercaptides. Preferably, the reaction to prepare the prepolymer is catalyzed by stannous octoate. The amount of catalyst employed is generally between 0.005 and 5 percent by weight of the mixture catalyzed, depending on the nature of the isocyanate.

The sealant composition of the invention also preferably contains a catalyst which has good stability in the absence of atmospheric moisture, but which has a rapid cure rate in the presence of atmospheric moisture, such as dimorpholinodiethyl ether or (di-(2-(3,5-dimethylmorpholino)ethyl)ether). Such catalyst, when employed, are preferably employed in an amount, based on the weight of the sealant, of from 0.2 to 1.75 percent.

For formulating sealant compositions, the prepolymer and the adduct are combined, preferably with fillers and additives known in the prior art for use in elastomeric compositions. By the addition of such materials, physical properties such as viscosity, flow rate, sag, and the like can be modified. However, to prevent premature hydrolysis of the moisture sensitive groups of the polymer, the filler should be thoroughly dried before admixture therewith. Exemplary filler materials and additives include materials such as carbon black, titanium dioxide, clays, calcium carbonate, surface treated silicas, ultraviolet stabilizers, antioxidants, and the like. This list, however, is not comprehensive and is given merely as illustrative.

The sealant composition also preferably contains one or more plasticizers or solvents to modified rheological properties to a desired consistency. Such materials should be free of water, inert to isocyanate groups, and compatible with the polymer. Such material may be added to the reaction mixtures for preparing the prepolymer or the adduct, or to the mixture for preparing the final sealant composition, but is preferably added to the reaction mixtures for preparing the prepolymer and the adduct, so that such mixtures may be more easily mixed and handled. Suitable plasticizers and solvents are well-known in the art and include dioctyl phthalate, dibutyl phthalate, a partially hydrogenated terpene commercially available as "HB-40", trioctyl phosphate, epoxy plasticizers, toluene-sulfamide, chloroparaffins, adipic acid esters, castor oil, and toluene.

ILLUSTRATIVE EMBODIMENTS

The following examples are given to illustrate the invention and should not be interpreted as limiting it in any way. Unless stated otherwise, all parts and percentages are given by weight.

EXAMPLE 1

(A) Preparation of Urethane Prepolymer

A urethane prepolymer is prepared by adding 681 g of polyoxypropylene diol having an average molecular weight of about 2,000, 990 g of polyoxy- propylenetriol having an average molecular weight of about 4,500, and 300 g of diphenylmethane 4,4'-diisocyanate to a 3-liter resin kettle equipped with a mechanical agitator, a nitrogen inlet adapter, a thermometer and a condenser. The mixture is purged under $N_2$ blanket and is thoroughly mixed. The internal temperature is raised to 50° C. and 0.3 g of stannous octoate is added to the mixture. After 2 hours, 990 g of alkyl phthalate plasticizer and 30 g of diethyl malonate are added to the kettle. The resulting prepolymer has an average functionality of 2.6 isocyanate groups per molecule, an isocyanate content of 1.45 percent, and a viscosity of 10,000 cps at 25° C.

(B) Preparation of Isocyanatosilane Adduct

An isocyanatosilane adduct (a reaction product of a secondary aminoalkoxy silane and a polyisocyanate) is prepared by adding 485 g of Mobay's Desmodur N-100 (2.59 equivalents) (a solvent-free aliphatic polyisocyanate resin based on hexamethylene diisocyanate), and 225 g of alkyl phthalate to a resin kettle equipped with a mechanical agitator, a thermometer, a $N_2$ inlet adapter and an addition funnel. The mixture is thoroughly mixed and purged under $N_2$ blanket. About 300 g of Union Carbide's Y-9494 silane (N,N-bis[(3-trimethoxysilyl)-propyl]amine) (0.88 equivalents) is slowly added to the mixture. The adduct has an isocyanate content of 7.0 percent.

(C) Preparation of Primerless to Glass Urethane Sealant

A moisture curable sealant composition was prepared under anhydrous condition by first degassing 850 g of the urethane prepolymer in a planetary mixer for 10 minutes and then mixing with 313 g of dried carbon black and 187 g clay (aluminum silicate, available as Iceberg Clay from Burgess Pigment Co.). Then, a mixture of 60 g of toluene, 6 g of dimorpholinodiethyl ether and 75 g of the isocyanatosilane adduct was added to the mixer. Mixing was carried out under reduced pressure for 10 minutes. The compounded sealant may be filled into tubes which are then sealed. The sealant shows good storage stability on exposure to 130° F. for 3 days, indicating that the sealant will not cure in storage in sealed containers on exposure to ambient temperatures for a longer period of time.

(D) Test of the Sealant

The lap shear strength of the sealant was tested by bonding a Bonderite™ coupon (steel with a protective phosphate coating) (1"x5"x0.03") primed with Essex Specialty Products, Inc. Betaseal™ 43532 primer (a primer comprising a solution of a polyester resin of a carboxylic acid and a glycol, and an aromatic polyisocyanate), and a clean plate glass coupon (1"x5"x0.25") with the sealant bead (1"x0.25"x5/16") applied from a sealant tube along one of the one-inch edges of the glass plate. The Bonderite and glass plate sandwich the sealant and compress its height to ⅓ inch. The sample was allowed to cure at 70° F. and 50 percent relative humidity (R.H.) for 5 days and then separated by pulling in a plane parallel to the plane of the bead with an Instron machine at a speed of 5"/minute. In this test, the lap shear strength of the sample is 650 psi, with cohesive failure within the sealant bead. A lap shear strength of 850 psi was obtained for the sealant with cohesive failure on exposure to a 100 percent relative humidity and 100° F. in a humidity box for 14 days. By comparison, the same sealant prepared without the isocyanatosilane adduct gave lap shear strength of 70 psi with an adhesive failure between the sealant bead and plate glass when cured at 70° F. and 50 percent relative humidity for 5 days.

Examples 2–13

Additional sealants are prepared using the method described in Example 1 using the amounts of components as shown on the following tables. In the following examples, the prepolymer, clay, carbon black, and silane are as described in Example 1. As used hereafter, "DMDEE" means dimorpholinodiethyl ether. "Isocyanate; NCO/NH" in the tables refers to the polyisocyanate used to prepare the particular adduct and the ratio of isocyanate groups to secondary amine groups in the reaction mixture to prepare the adduct. The various polyisocyanates used in the examples are Desmodur N-100 ("N-100"), Desmodur™ Z-4370 (an aliphatic polyisocyanate based on isophorone diisocyanate, available from Miles Corporation) ("Z-4370"), isophorone diisocyanate ("IPDI") (available from Huls Aktiengesellschaft), Desmodur™ N-3300 (an aliphatic polyisocyanate resin based on hexamethylene diisocyanate, available from Miles Corporation) ("N-3300"), and PAPI™-20 (polymethylene polyphenylisocyanate, available from The Dow Chemical Company). The lap shear samples were prepared as described in Example 1, were cured under the conditions described in the tables, and tested according to the procedure described in Example 1. Samples which were cured while immersed in water are referred to in the table as cured "in $H_2O$." Unless otherwise specified, the samples were cured at a relative humidity of about 50 percent. The abbreviations for the types of failure mode are as follows:

CF - cohesive failure - failure within adhesive; adhesive remains on both substrates.

AFG - adhesive failure between the sealant and the glass.

PPF - adhesive failure between the sealant and the primer applied to the metal coupon.

| Component (% by weight) | Example 2 | Example 3 | Example 4 | Example 5 | Example 6 | Example 7 |
| --- | --- | --- | --- | --- | --- | --- |
| Prepolymer | 59.2 | 58.8 | 58.8 | 57.8 | 58.5 | 59.8 |
| Carbon Black | 20.3 | 20.9 | 20.9 | 20.9 | 20.8 | 20.3 |
| Clay | 12.0 | 12.4 | 12.4 | 12.4 | 12.4 | 12.0 |
| Toluene | 3.9 | 4.0 | 4.0 | 3.5 | 3.0 | 4.5 |
| DMDEE | 0.32 | 0.4 | 0.4 | 0.4 | 0.3 | 0.4 |
| Silane |  | 0.5 | 0.5 |  |  |  |
| silane/polyisocyanate adduct (Isocyanate; NCO:NH) | 3.8 (Z-4370; 2:1) | 3.1 (IPDI; 2:1) | 3.1 (diff. iso used) (Z-4370; 2:1) | 4.0 (PAPI-20; 2:1) | 5.0 (N-100; 3:2) | 3.0 (N-100; 2:1) |
| Curing conditions | Lap Shear strength, (psi); (mode of failure) | Lap Shear strength, (psi); (mode of failure) | Lap Shear strength, (psi); (mode of failure) | Lap Shear strength, (psi); (mode of failure) | Lap Shear strength, (psi); (mode of failure) | Lap Shear strength, (psi); (mode of failure) |
| 4 days @ 70° F. | 237 (100% AFG) | 202 (100% AFG) | 430 (67% AFG/33% CF) | 387 (33% AFG/67%CF) | 692 (100% CF) | 716 (100% CF) |
| 100 days in $H_2O$ @ 90° F. | 457 (33% AFG/ 67% CF) | 288 (62% CF/38% PPF) | 314 (82% CF/18% PPF) | 531 (100% CF) | 828 (100% CF) | 455 (100% CF) |

| | | | | | | |
|---|---|---|---|---|---|---|
| 4 days @ 190° F. | 766 (100% CF) | 697 (100% CF) | 823 (100% CF) | 929 (100% CF) | 866 (100% CF) | 714 (100% CF) |
| 14 days @ 100° F./100% R.H. | 695 (100% CF) | 719 (100% CF) | 608 (100% CF) | 629 (100% CF) | 584 (100% CF) | 357 (100% CF) |

| Component | Example 8 | Example 9 | Example 10 | Example 11 | Example 12 | Example 13 |
|---|---|---|---|---|---|---|
| Prepolymer | 57.8 | 56.8 | 65.0 | 58.4 | 58.4 | 56.3 |
| Carbon Black | 20.9 | 20.9 | 26.0 | 20.9 | 20.9 | 20.9 |
| Clay | 12.4 | 12.4 | | 12.4 | 12.4 | 12.4 |
| Toluene | 4.5 | 4.5 | 4.0 | 3.0 | 3.0 | 5.4 |
| DMDEE | 0.4 | 2.4 | 0.33 | 0.33 | 0.33 | 0.33 |
| Silane silane/poly- isocyanate adduct (Isocyanate; NCO:NH) | 4.0 (N-100; 2:1) | 5.0 (N-100; 2:1) | 5.0 (N-100; 3:1) | 5.0 (N-3300; 2:1) | 5.0 (N-3300; 3:2) | 5.0 (N-3300; 3:2) |
| Curing Conditions | Lap Shear strength, (psi); (mode of failure) | Lap Shear strength, (psi); (mode of failure) | Lap Shear strength, (psi); (mode of failure) | Lap Shear strength, (psi); (mode of failure) | Lap Shear strength, (psi); (mode of failure) | Lap Shear strength, (psi); (mode of failure) |
| 4 days @ 70° F. | 654 (100% CF) | 646 (100% CF) | 870 (100% CF) | 780 (100% CF) | 489 (100% CF) | 650 (100% CF) |
| 100 days in H2O @ 90° F. | 649 (100% CF) | 675 (100% CF) | 580 (100% CF) | 722 (100% CF) | 676 (100% CF) | 550 (100% CF) |
| 14 days @ 190° F. | 865 (100% CF) | 840 (100% CF) | 950 (100% CF) | 866 (100% CF) | 879 (100% CF) | 810 (100% CF) |
| 14 days @ 100° F./100% R.H. | 652 (100% CF) | 852 (100% CF) | 620 (100% CF) | 826 (100% CF) | 728 (100% CF) | 730 (100% CF) |

Example 13

Using the same procedure as in Example 1, a sealant is prepared from a prepolymer (66 parts), an isocyanato silane adduct prepared from a silane and N-100 (NCO:NH—3:1) (2.2 parts), a hydroxybenzotriazole compound (a U.V.-absorbing material, available as Tinuvin 328 from Ciba-Geigy) (0.5 parts), a hindered amine compound (an additive to prevent polymers from photooxidation, available as Tinuvin 765 from Ciba-Geigy) (0.5 parts), a hindered phenolic compound (a thermal antioxidant available from Ciba-Geigy) (0.5 parts), carbon black (available as Elftex 8 from Cabot Corporation) (29.5 parts), DMDEE (0.6 parts). The prepolymer, silane, and N-100 are the same as described in Example 1. Lap shear testing samples are prepared and tested as described in Example 1. The results are as follows: lap shear strength (psi)/mode of failure: cured for 6 days at 70° F./50% R.H.—590 psi/100% CF; cured for 10 days in H₂O, 90° F.—713 psi/100% CF; cured for 14 days at 100° F./100% R.H.—711 psi/100% CF.

Example 14

Using the same procedure as in Example 1, a sealant is prepared from a prepolymer which is the reaction product of the prepolymer of Example 1 and the silane of example 1 in a 99:1 weight ratio (57.8 parts), an isocyanato silane adduct prepared from a silane and N-100 (NCO:NH—3:1) (4.0 parts), carbon black (available as Elftex 8 from Cabot Corporation) (20.9 parts), DMDEE (0.4 parts), toluene (4.5 parts), and clay (4.5 parts). The prepolymer, silane, and N-100 are the same as described in Example 1. Lap shear testing samples are prepared and tested as described in Example 1. The results are as follows: (lap shear strength (psi)/mode of failure) is as follows: cured for 7 days at 70° F., 50% R.H.—802 psi/100% CF; cured for 10 days immersed in H₂O, 90° F.—519 psi/100% CF; cured for 14 days at 190° F.—586 psi/100% CF; cured for 14 days at 100° F., 100% R.H.—472 psi/100% CF.

The examples show that sealants containing an adduct prepared from a secondary amino silane and a polyisocyanate provide a sealant with excellent adhesive properties when used to bond glass to metal, even when a glass primer in not applied separately to the glass prior to bonding. The examples also show that sealants prepared using isocyanato silane adducts prepared from aliphatic polyisocyanate resins prepared from hexamethylene diisocyanate (N-100 and N-3300) provide higher lap shear strengths. Cohesive failure is the preferred mode of failure since the bond line fails in a consistent and predictable manner, providing relatively consistent lap shear values from sample to sample. Also, higher lap shear strength values are generally preferred, so long as cohesive failure is maintained.

What is claimed is:

1. A polyurethane sealant composition comprising (1) a urethane prepolymer having an isocyanate functionality of from about 2.0 to about 4.0 and an isocyanate content of from about 1.0 to 10 percent: and from about 0.5 to about 20 percent by weight based on the sealant composition of (2) a reaction product of a secondary aminoalkoxy silane and an aliphatic or aromatic polyisocyanate selected from the group consisting of ethylene diisocyanate, 1,4-tetramethylene diisocyanate, 1,6-hexamethylene diisocyanate, 1,12-dodecane diisocyanate, cyclobutane1,3-diisocyanate, cyclohexane-1,3- and 1,4-diisocyanate, 1-isocyanato-3,3,5-trimethyl-5-isocyanato methyl cyclohexane, 2,4- and 2,6-hexahydrotolylene diisocyanate, hexahydro-1,3- and 1,4-phenylene diisocyanate, perhydro-2,5'- and 4,4'-diphenyl methane diisocyanate, 1,3- and 1,4-phenylene diisocyanate, 2,4-and 2,6-tolylene diisocyanate, diphenyl methane-2,4'and 4,4'-diisocyanate, naphthylene-1,5-diisocyanate, triphenyl methane-4,4',4"-triisocyanate, polyphenyl polymethylene polyisocyanate, isophorone diisocyanate, tetramethylxylene diisocyanate and mixtures thereof, said reaction product having an average of at least one silane group and at least one isocyanate group per molecule and a molecular weight of less than about 2,000, wherein the sealant composition does not contain bitumin.

2. The polyurethane sealant composition of claim 1 wherein the isocyanate functionality of the prepolymer is from about 2.2 to about 3.0.

3. The polyurethane sealant composition of claim 1 wherein the isocyanate functionality of the prepolymer is from about 2.4 to about 3.0.

4. The polyurethane sealant of claim 1 wherein the polyisocyanate used to prepared component (2) is isopherone diisocyanate, a polymethylene polyphenyl isocyanate or an aliphatic polyisocyanate.

5. The polyurethane sealant composition of claim 1 wherein the isocyanate content of the prepolymer is in the range of from about 1.5 percent to about 5.0 percent.

6. The polyurethane sealant composition of claim 1 wherein the isocyanate content of the prepolymer is in the range of from about 1.8 percent to about 3.0 percent.

7. The polyurethane sealant composition of claim 1 wherein component (2) has at least 1.5 isocyanate groups and at least one silane group per molecule.

8. The polyurethane sealant composition of claim 1 wherein component (2) has at least two isocyanate groups and at least one silane group per molecule.

9. The polyurethane sealant composition of claim 1 wherein component (2) is present in an amount, based on the weight of the sealant composition, in the range of from about 1.0 percent to about 10 percent.

10. The polyurethane sealant composition of claim 1 wherein component (2) is present in an amount, based on the weight of the sealant composition, in the range of from about 2.0 percent to about 7 percent.

11. The polyurethane sealant composition of claim 1 wherein the polyisocyanate used to prepare component (2) has a molecular weight of less than about 2,000.

12. The polyurethane sealant composition of claim 4 wherein the polyisocyanate used to prepare component (2) has a molecular weight of less than about 1,000.

13. The polyurethane sealant composition of claim 12 wherein the polyisocyanate used to prepare component (2) is hexamethylene diisocyanate.

14. A polyurethane sealant composition according to claim 1 wherein the secondary aminoalkoxy silane corresponds to the following formula:

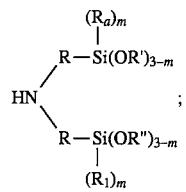

wherein

R is independently in each occurrence a divalent organic group;

R', R'', $R_1$ and $R_a$ are independently in each occurrence hydrogen or alkyl; and m is an integer of from about 0 to about 2.

15. A polyurethane sealant composition according to claim 1 wherein the secondary aminoalkoxy silane is N,N'-bis((3-trimethoxysilyl)propyl)amine.

16. A polyurethane sealant composition comprising (1) a urethane prepolymer having an isocyanate functionality of at least 2.0 and an isocyanate content of from about 1.0 to 10 percent wherein isocyanate prepolymer is prepared from a polyisocyanate having a functionality of from about 2.0 to about 4.0 and a polyol having a functionality of from about 1.5 to about 4.0 and an equivalent weight of about 200 to about 3,500; and from about 0.5 to about 20 percent by weight based on the sealant composition of (2) a reaction product of a secondary aminoalkoxy silane and an aliphatic or aromatic polyisocyanate selected from the group consisting of ethylene diisocyanate, 1,4tetramethylene diisocyanate, 1,6-hexamethylene diisocyanate, 1,12-dodecane diisocyanate, cyclobutane1,3-diisocyanate, cyclohexane-,1,3- and 1,4-diisocyanate, 1-isocyanato-3,3,5-trimethyl-5-isocyanato methyl cyclohexane, 2,4- and 2,6-hexahydrotolylene diisocyanate, hexahydro-1,3- and 1,4-phenylene diisocyanate, perhydro-2,5'- and 4,4'-diphenyl methane diisocyanate, 1,3- and 1,4-phonylone diisocyanate, 2,4-and 2,6-tolylene diisocyanate, diphenyl methane-2,4'-and 4,4'-diisocyanate, naphthylene-1,5-diisocyanate, triphenyl methane-4,4',4"-triisocyanate, polyphenyl polymethylerie polyisocyanate, isophorone diisocyanate, tetramethylxylene diisocyanate and mixtures thereof, said reaction product having an average of at least one silane group and at least one isocyanate group per molecule and a molecular weight of less than about 2,000, wherein the sealant composition does not contain bitumin.

17. The polyurethane sealant composition of claim 16 wherein the functionality of the polyisocyanate is about 2.0 to about 3.0 or less and the functionality of the polyol is about 1.8 to about 3.0.

18. The polyurethane sealant composition of claim 17 wherein the isocyanate content of the prepolymer is in the range of from about 1.5 percent to about 5.0 percent.

19. The polyurethane sealant composition of claim 17 wherein the isocyanate content of the prepolymer is in the range of from about 1.8 percent to about 3.0 percent.

20. The polyurethane sealant composition of claim 18 wherein Component (2) has at least 1.5 isocyanate groups and at least one silane group per molecule.

21. The polyurethane sealant composition of claim 18 wherein Component (2) has at least two isocyanate groups and at least one silane group per molecule.

22. The polyurethane sealant composition of claim 18 wherein Component (2) is present in an amount, based on the weight of the sealant composition, in the range of from about 1.0 percent to about 10 percent.

23. The polyurethane sealant composition of claim 18 wherein the polyisocyanate used to prepare Component (2) has a molecular weight of less than about 2,000.

24. A polyurethane sealant composition according to claim 16 wherein the secondary aminoalkoxy silane corresponds to the following formula:

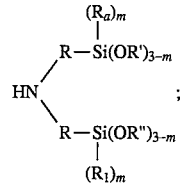

wherein

R is independently in each occurrence a divalent organic group;

R', R'', $R_1$ and $R_a$ are independently in each occurrence hydrogen or alkyl.

25. A polyurethane sealant composition according to claim 16 wherein the secondary aminoalkoxy silane is N,N'-bis((3-trimethoxysilyl)propyl)amine.

26. The polyurethane sealant of claim 16 wherein the polyisocyanate used to prepare Component (2) is isopherone diisocyanate, a polymethylene polyphenyl isocyanate or an aliphatic polyisocyanate.

* * * * *